United States Patent
Osborne et al.

(10) Patent No.: US 11,346,762 B2
(45) Date of Patent: May 31, 2022

(54) SYSTEMS FOR DYNAMIC LIGHT DETECTION OBSCURATION AND METHODS FOR USING THEREOF

(71) Applicant: BECTON, DICKINSON AND COMPANY, Franklin Lakes, NJ (US)

(72) Inventors: Geoffrey Osborne, Los Gatos, CA (US); Jianying Cao, San Jose, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 22 days.

(21) Appl. No.: 16/250,942

(22) Filed: Jan. 17, 2019

(65) Prior Publication Data

US 2019/0226975 A1 Jul. 25, 2019

Related U.S. Application Data

(60) Provisional application No. 62/620,916, filed on Jan. 23, 2018.

(51) Int. Cl.
*G01N 15/14* (2006.01)
*G01N 15/10* (2006.01)

(52) U.S. Cl.
CPC ..... *G01N 15/1436* (2013.01); *G01N 15/1434* (2013.01); *G01N 15/1459* (2013.01); *G01N 2015/1006* (2013.01)

(58) Field of Classification Search
CPC .................................................. G01N 15/1436
USPC ........................................................ 356/343
See application file for complete search history.

(56) References Cited

U.S. PATENT DOCUMENTS

| | | | |
|---|---|---|---|
| 3,960,449 A | 6/1976 | Carleton et al. |
| 4,233,619 A | 11/1980 | Webb et al. |
| 4,347,935 A | 9/1982 | Merrill |
| 4,612,555 A | 9/1986 | Hongou et al. |
| 4,667,830 A | 5/1987 | Nozaki, Jr. et al. |
| 4,668,860 A | 5/1987 | Anthon |
| 4,704,891 A | 11/1987 | Recktenwald |
| 4,770,992 A | 9/1988 | Van Den Engh |
| 5,030,002 A | 7/1991 | North, Jr. |

(Continued)

FOREIGN PATENT DOCUMENTS

| | | |
|---|---|---|
| EP | 2629072 A1 | 8/2013 |
| KR | 10-2006-0079164 A | 7/2006 |

*Primary Examiner* — Tri T Ton
(74) *Attorney, Agent, or Firm* — Peter W. Schroen; Bret E. Field; Bozicevic, Field & Francis LLP

(57) ABSTRACT

Systems for differentially detecting light from a sample in a flow stream (e.g., in a flow cytometer) across one or more dimensions are described. Light detection systems according to embodiments include a flow cell configured to propagate a sample in a flow stream, a light source configured to irradiate the sample in the flow cell and a detector system having an optical adjustment component and a detector that is configured to differentially detect light from the flow cell without a scatter bar. Systems according to certain embodiments are configured to differentially detect light by modulating one or more components of the optical adjustment component or the detector. Methods for differentially detecting light from a sample in a flow stream with a detector unit without a scatter bar are also described. Kits having two or more components for use in the subject systems are also provided.

20 Claims, 4 Drawing Sheets

(56) References Cited

U.S. PATENT DOCUMENTS

| | | |
|---|---|---|
| 5,040,890 A | 8/1991 | North, Jr. |
| 5,047,321 A | 9/1991 | Loken et al. |
| 5,241,180 A | 8/1993 | Ishaque et al. |
| 5,245,318 A | 9/1993 | Tohge et al. |
| 5,317,162 A | 5/1994 | Pinsky et al. |
| 5,394,430 A | 2/1995 | Huang |
| 5,464,581 A | 11/1995 | Van Den Engh |
| 5,483,469 A | 1/1996 | Van Den Engh |
| 5,602,039 A | 2/1997 | Van Den Engh |
| 5,620,842 A | 4/1997 | Davis et al. |
| 5,627,040 A | 5/1997 | Bierre et al. |
| 5,643,796 A | 7/1997 | Van Den Engh |
| 5,675,155 A | 10/1997 | Pentoney, Jr. et al. |
| 5,700,692 A | 12/1997 | Sweet |
| 5,949,073 A | 9/1999 | Shimoyama |
| 6,372,506 B1 | 4/2002 | Norton |
| 6,809,804 B1 | 10/2004 | Yount et al. |
| 6,813,017 B1 | 11/2004 | Hoffman et al. |
| 6,821,740 B2 | 11/2004 | Darzynkiewicz |
| 6,879,397 B2 | 4/2005 | Lloyd |
| 7,007,845 B2 | 3/2006 | Aoshima et al. |
| 7,014,326 B2 | 3/2006 | Danagher et al. |
| 7,129,505 B2 | 10/2006 | Oostman, Jr. et al. |
| 7,199,369 B1 | 4/2007 | Heverly |
| 7,201,875 B2 | 4/2007 | Norton et al. |
| 7,544,326 B2 | 6/2009 | Norton et al. |
| 8,140,300 B2 | 3/2012 | Dunne et al. |
| 8,184,285 B2 | 5/2012 | Moser et al. |
| 8,233,146 B2 | 7/2012 | Chen |
| 8,525,119 B2 | 9/2013 | Luhta et al. |
| 8,686,463 B2 | 4/2014 | Kitajima |
| 8,753,573 B2 | 6/2014 | Van Den Engh |
| 8,836,935 B1 | 9/2014 | Meeks et al. |
| 8,975,595 B2 | 3/2015 | Norton et al. |
| 9,092,034 B2 | 7/2015 | Vrane et al. |
| 9,095,494 B2 | 8/2015 | Warner et al. |
| 9,097,640 B2 | 8/2015 | Goldberg et al. |
| 2002/0141625 A1* | 10/2002 | Nelson ................. G01N 23/046 382/131 |
| 2004/0036874 A1 | 2/2004 | Kramer et al. |
| 2007/0121095 A1 | 5/2007 | Lewis |
| 2012/0156714 A1 | 6/2012 | O'Brien et al. |
| 2013/0015331 A1 | 1/2013 | Birk et al. |
| 2013/0131447 A1 | 5/2013 | Benning |
| 2013/0204538 A1 | 8/2013 | Rich et al. |
| 2014/0230861 A1 | 10/2014 | Smargiassi et al. |
| 2015/0056645 A1* | 2/2015 | Vacca ................. G01N 15/1434 435/29 |
| 2015/0377860 A1 | 12/2015 | Schentag et al. |
| 2016/0011096 A1 | 1/2016 | Vacca |
| 2017/0234675 A1* | 8/2017 | Iddan ................. G01B 9/02069 356/479 |
| 2018/0038784 A1* | 2/2018 | Marks ................. G01N 15/1404 |
| 2018/0147573 A1* | 5/2018 | Hiddessen .......... B01F 13/1022 |

* cited by examiner

SYSTEMS FOR DYNAMIC LIGHT DETECTION OBSCURATION AND METHODS FOR USING THEREOF

INTRODUCTION

Light detection is often used to characterize components of a sample (e.g., biological samples), for example when the sample is used in the diagnosis of a disease or medical condition. When a sample is irradiated, light can be scattered by the sample, transmitted through the sample as well as emitted by the sample (e.g., by fluorescence). Variations in the sample components, such as morphologies, absorptivity and the presence of fluorescent labels may cause variations in the light that is scattered, transmitted or emitted by the sample. These variations can be used for characterizing and identifying the presence of components in the sample. To quantify these variations, the light is collected and directed to the surface of a detector. The amount of light that reaches the detector can impact the overall quality of the optical signal outputted by the detector. The amount of light that reaches the detector can be raised by increasing the surface area of the detector or by increasing collection of the light from the sample.

One technique that utilizes light detection to characterize the components in a sample is flow cytometry. Using data generated from the detected light, distributions of the components can be recorded and where desired material may be sorted. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. Within the flow cell, a liquid sheath is formed around the cell stream to impart a substantially uniform velocity on the cell stream. The flow cell hydrodynamically focuses the cells within the stream to pass through the center of a light source in a flow cell. Light from the light source can be detected as scatter or by transmission spectroscopy or can be absorbed by one or more components in the sample and re-emitted as luminescence. Variations in the materials, such as morphologies or fluorescent label, cause variations in the observed light which allow for characterization by collecting the light onto an optical detector.

SUMMARY

Systems for differentially detecting light from a sample in a flow stream (e.g., in a flow cytometer) across one or more dimensions are described. Light detection systems according to embodiments include a flow cell configured to propagate a sample in a flow stream, a light source configured to irradiate the sample in the flow cell and a detector system having an optical adjustment component and a detector that is configured to differentially detect light from the flow cell without a scatter bar. Systems according to certain embodiments are configured to differentially detect light by modulating one or more components of the optical adjustment component or the detector. Methods for differentially detecting light from a sample in a flow stream with a detector unit without a scatter bar are also described. Kits having two or more components for use in the subject systems are also provided.

Aspects of the present disclosure include light detection systems that differentially detect light from an irradiated flow cell without a scatter bar. Systems according to certain embodiments are configured to dynamically obscure light emanating from the sample (e.g., scatter, fluorescence, transmission, etc.). Systems of interest include a flow cell configured to propagate a sample in a flow stream, a light source configured to irradiate the sample in the flow cell and a detector unit configured to differentially detect light from the flow cell. In some embodiments, the detector unit includes a detector. In these embodiments, the system is configured to differentially detect light by modulating the detector. In other embodiments, the detector unit includes an optical adjustment component and a detector. In these embodiments, the detector unit may be configured to differentially detect light by modulating one or more components of the optical adjustment component or the detector.

In some embodiments, the detector unit includes a fused fiber optic component (e.g., a tapered fused fiber optic bundle) and detector (e.g., an array of photodiodes). The optical adjustment component is, in certain embodiments, in physical contact with the detector. In some instances, the detector unit includes a light conducting material between the optical adjustment component and the detector, such as a gel (e.g., a refractive index matching gel). In some embodiments, the detector unit is configured to differentially detect light from the flow cell by inactivating a subset of the photodiodes in the array. In some instances, the inactivation is reversible. In other instances, the inactivation is irreversible. The inactivated subset of photodiodes may form a predetermine pattern, such as a one or more lines, a polygonal pattern, a symmetric pattern or an asymmetric pattern.

In other embodiments, the detector unit includes a micro-opto-electro-mechanical system (MOEMS), such as a digital micro-mirror device and a detector. In some instances, the digital micro-mirror device is configured to modulate a subset of mirrors. In one example, the detector unit is configured to differentially detect light from the flow cell by tilting a subset of mirrors on the digital micro-mirror device. In another example, the detector unit is configured to differentially detect light from the flow cell by inactivating a subset of mirrors on the digital micro-mirror device. For instance, the subset of mirrors on the digital micro-mirror device may be galvanically inactivated. The modulated subset of mirrors on the digital micro-mirror device may form a predetermined shape or pattern on the digital micro-mirror surface, such as one or more lines, a polygonal pattern, a symmetric pattern or an asymmetric pattern.

Aspects of the disclosure also include methods for differentially detecting light from a sample. Methods according to certain embodiments, include irradiating with a light source a flow cell with a sample in a flow stream and detecting light from the flow cell with a detector unit that is configured to differentially detect light from the flow stream without a scatter bar. In some embodiments, the detector unit includes a detector. In these embodiments, methods include differentially detecting light by modulating the detector. In other embodiments, the detector unit includes an optical adjustment component and a detector and the method further includes modulating one or more components of the optical adjustment component or the detector. In some instances, the detector unit includes a fused fiber optic component (e.g., a tapered fused fiber optic bundle) and a photodiode detector array and methods include inactivating a subset of photodiodes in the array to differentially detect light from the sample. For example, a subset of photodiodes in the array may be inactivated in the form of a predetermined pattern, such as one or more lines, polygonal patterns, symmetric patterns or asymmetric patterns. In other instances, the detector unit includes a digital micro-mirror device and a detector and methods include modulating a subset of mirrors on the digital micro-mirror surface to differentially detect light from the sample. For example, the subset of mirrors may be tilted, rotated or inactivated, such as being galvanically inactivated. The subset of mirrors may be in the form of a predetermined shape or pattern on the digital micro-mirror surface, such as in the form of one or more lines, polygonal patterns, symmetric pattern or asymmetric patterns.

Kits including one or more components of the subject light detection systems are also provided. Kits according to certain embodiments, include a flow cell and one or more components of the detector units as described above, such as an optical adjustment component (e.g., mirrors, lenses, collimators, pinholes, slits, fiber optics) as well as a detector (e.g., a photodiode, photomultiplier tube or an array of photodiodes or photomultiplier tubes).

BRIEF DESCRIPTION OF THE FIGURES

The invention may be best understood from the following detailed description when read in conjunction with the accompanying drawings. Included in the drawings are the following figures.

DETAILED DESCRIPTION

Figure 1:
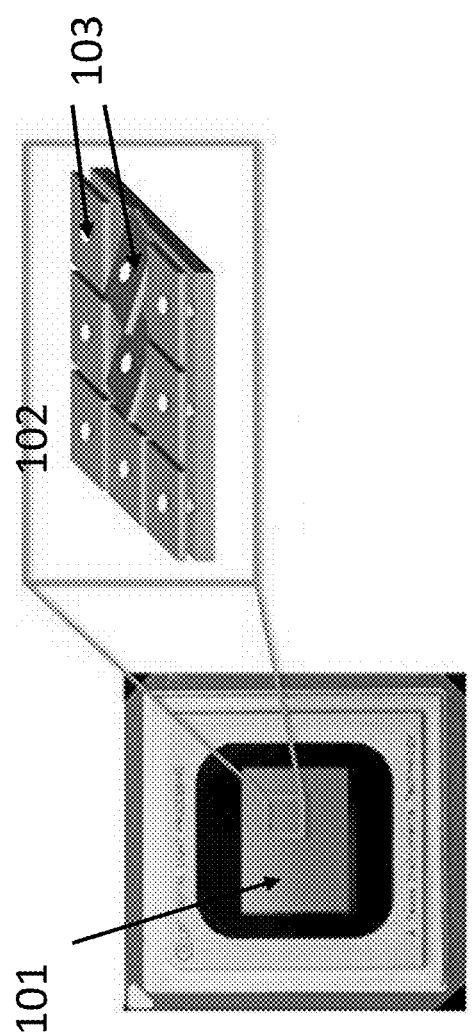
FIG. 1 depicts a digital micro-mirror device according to certain embodiments.

Systems for differentially detecting light from a sample in a flow stream (e.g., in a flow cytometer) across one or more dimensions are described. Light detection systems according to embodiments include a flow cell configured to propagate a sample in a flow stream, a light source configured to irradiate the sample in the flow cell and a detector system having an optical adjustment component and a detector that is configured to differentially detect light from the flow cell without a scatter bar. Systems according to certain embodiments are configured to differentially detect light by modulating one or more components of the optical adjustment component or the detector. Methods for differentially detecting light from a sample in a flow stream with a detector unit without a scatter bar are also described. Kits having two or more components for use in the subject systems are also provided.

Before the present invention is described in greater detail, it is to be understood that this invention is not limited to particular embodiments described, as such may vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

As summarized above, the present disclosure provides light detection systems for differentially detecting light from a sample in a flow cell. In further describing embodiments of the disclosure, light detection systems in accordance with embodiments of the invention are described first in greater detail. Next, methods for differentially detecting light from a sample in a flow cell are described. Kits having a flow cell, an optical adjustment component and a detector unit for differentially detecting light from a sample are also provided.

Detections Systems for Differentially Detecting Light

Aspects of the present disclosure include light detection systems configured for differentially detecting light from a sample in a flow cell. In some embodiments the subject systems are configured to dynamically distinguish light emanating from the sample flowing through the flow cell. For instance, the light detection system may be configured to dynamically distinguish light from a sample in the flow cell based on intensity. In other instances, the light detection system is configured to distinguish light emanating from different particle populations in the sample, such as to distinguish between different cell populations in the sample.

In still other embodiments, light detection systems are configured to dynamically obscure incident light from the irradiating light source, such as by reducing the amount of incident light from the irradiating light source being detected by 50% or more, such as by 60% or more, such as by 75% or more, such as by 80% or more, such as by 85% or more, such as by 90% or more, such as by 95% or more, such as by 97% or more, such as by 99% or more and including reducing the amount of incident light from the irradiating light source being detected by 99.9% or more. By reducing the amount of detected incident light from the irradiating light source, detector signal intensity from fluorescence and scattered light from the sample are increased as compared to detector signals from fluorescence and scattered light collected by a light collection system not configured to differentially detect light as set forth herein. In some embodiments, detector signal intensity from fluorescence and scattered light measured by light detection systems described herein is increased by 10% or more, such as by 25% or more, such as by 50% or more, such as by 75% or more, such as by 90% or more and including by 95% or more, such as being increased by 1.5-fold or more, such as by 2-fold or more, such as by 3-fold or more, such as by 5-fold or more and including by 10-fold or more.

In embodiments, light detection systems include a flow cell configured to propagate a sample in a flow stream, a light source configured to irradiate the sample in the flow cell and a detector unit that is configured to differentially detect light from the flow cell without a scatter bar. In some embodiments, the detector unit includes an optical adjustment component and a detector. In these embodiments, to differentially detect light from the sample light detection systems are configured to modulate one or more components of the optical adjustment component or the detector. The term "optical adjustment" is used herein in its conventional sense to refer to a component that optically changes the light from the sample in the flow cell. For example, the beam path, direction, focus or collimation of the light from the sample may be changed with the optical adjustment component. Optical adjustment components may include, but are not limited to, lenses (e.g., focusing, objective, magnifying, etc.), collimators, mirrors (e.g., dichroic mirrors), slits, pinholes, filters (e.g., bandpass, interference), diffraction gratings, monochromators, among other types of optical adjustment components. In some embodiments, the optical adjustment component in the subject detector unit is a light relay system, such as a fiber optics light relay system. Any fiber optics light relay system may be employed to propagate light to from the sample to the detector in the detector unit. In certain embodiments, suitable fiber optics light relay systems for propagating light from the sample to the detector include, but are not limited to, fiber optics light relay systems such as those described in U.S. Pat. No. 6,809,804, the disclosure of which is herein incorporated by reference. In certain embodiments, the optical adjustment component is a fused fiber optic component, such as a tapered fused fiber optic component. In some embodiments, the fiber optic light component is in physical contact with the detector. In other embodiments, the fused fiber optics component is coupled to the detector by positioning a light conducting material between the fiber optic bundle and the detector surface. Any suitable light conducting material may be employed, such as a light conducting gel. For example, the light conducting material may be a refractive index matching light conducting gel.

In certain embodiments, the optical adjustment component is a micro-opto-electro-mechanical system (MOEMS), such as a digital micro-mirror device (DMD). The term digital micro-mirror device is referred to herein in its conventional sense to the micro-opto-electromechanical systems having a substrate (e.g., a planar substrate) with a plurality of micro-mirrors on the digital micro-mirror device active surface that are individually actuatable. By "individually actuatable" is meant that each micro-mirror may be individually modulated such that light reflected by the digital micro-mirror device may be differentially reflected from the active surface. Modulating each micro-mirror may include one or more of rotating, tilting or inactivating (e.g., galvanically inactivating) the mirror such that the reflectivity of each micro-mirror is adjusted as desired. In embodiments, where the micro-mirror is modulated by rotating, tilting or inactivating the micro-mirror, the desired reflectivity of the micro-mirror may be reduced by 1% or more, such as by 2% or more, such as by 3% or more, such as by 5% or more, such as by 10% or more, such as by 15% or more, such as by 25% or more, such as by 50% or more, such as by 75% or more, such as by 90% or more, such as by 95% or more, such as by 97% or more, such as by 99% or more and including reducing the reflectivity of the micro-mirror by 100%. As described in greater detail below, in some embodiments a subset of mirrors may be modulated to increase or reduce the amount of light from the sample that is propagated to a detector. In other embodiments, a subset of mirrors may be modulated to mask or obscure light (e.g., incident light from the irradiating light source or light from undesired sample populations) that is propagated to the detector. In yet other embodiments, a subset of mirrors may be modulated to distinguish light from different populations of particles in the sample, such as light emanating from different types of cells in the sample.

FIG. 1 depicts a digital micro-mirror device according to certain embodiments. The digital micro-mirror device 100 includes an active surface 101 having a plurality of micro-mirrors positioned in an array 102. Each micromirror 103 is individually actuatable, including where the micro-mirror is tilted, rotated or inactivated to reduce or eliminate reflection of light by the modulated micromirror.

The active surface of digital micro-mirror devices of interest may be any suitable shape and may be a rectilinear shape, e.g., squares, rectangles, trapezoids, triangles, hexagons, etc., curvilinear shapes, e.g., circles, ovals, as well as irregular shapes, e.g., a parabolic bottom portion coupled to a planar top portion. In certain embodiments, the digital micro-mirror device is planar, having a rectangular-shaped active surface. Digital micro-mirror devices of interest may have an active surface having a length that varies, ranging from 5 mm to 100 mm, such as from 10 mm to 90 mm, such as from 15 mm to 85 mm, such as from 20 mm to 80 mm, such as from 25 mm to 75 mm, such as from 30 mm to 70 mm and including from 35 mm to 65 mm. The width of the active surface may also vary ranging from 5 mm to 100 mm, such as from 10 mm to 90 mm, such as from 15 mm to 85 mm, such as from 20 mm to 80 mm, such as from 25 mm to 75 mm, such as from 30 mm to 70 mm and including from 35 mm to 65 mm. In embodiments, depending on the shape of the digital micro-mirror device, the active surface may have a surface area of from 5 $mm^2$ to 1000 $mm^2$, such as from 10 $mm^2$ to 900 $mm^2$, such as from 15 $mm^2$ to 800 $mm^2$, such as from 20 $mm^2$ to 700 $mm^2$, such as from 25 $mm^2$ to 600 $mm^2$, such as from 30 $mm^2$ to 500 $mm^2$, such as from 35 $mm^2$ to 400 $mm^2$ and including from 40 $mm^2$ to 300 $mm^2$.

The number of individually actuatable mirrors on the active surface of the digital micro-mirror device may also vary, depending on the type of sample flowing through the flow cell and the size of the device and may be 50 micro-mirrors or more, such as 100 micro-mirrors or more, such as 250 micro-mirrors or more, such as 500 micro-mirrors or more, such as 750 micro-mirrors or more, such as 1000 micro-mirrors or more, such as from 2500 micro-mirrors or more, such as 5000 micro-mirrors or more, such as 7500 micro-mirrors or more, such as 10,000 micro-mirrors or more and including 25,000 micro-mirrors or more. Each micro-mirror may have dimensions that vary, where micro-mirrors of interest have lengths of from 1 µm to 25 µm, such as from 2 µm to 24 µm, such as from 3 µm to 23 µm, such as from 4 µm to 22 µm, such as from 5 µm to 20 µm, such as from 6 µm to 19 µm, such as from 7 µm to 18 µm, such as from 8 µm to 17 µm, such as from 9 µm to 16 µm and including from 10 µm to 15 µm. Each micro-mirror may have a width that ranges from 1 µm to 25 µm, such as from 2 µm to 24 µm, such as from 3 µm to 23 µm, such as from 4 µm to 22 µm, such as from 5 µm to 20 µm, such as from 6 µm to 19 µm, such as from 7 µm to 18 µm, such as from 8 µm to 17 µm, such as from 9 µm to 16 µm and including from 10 µm to 15 µm.

In some embodiments, light detection systems are configured to differentially detect light by modulating a subset of micro-mirrors on the digital micro-mirror device. In some instances, modulating includes tilting a subset of micro-mirrors to reduce the desired reflectivity by the subset of mirrors. Each micro-mirror may be tilted by 5° to 15° with respect to the surface of the digital micro-mirror device, such as from 6° to 14°, such as from 7° to 13° and including from being tilted by 8° to 12° with respect to the surface of the digital micro-mirror device. In other instances, modulating includes rotating a subset of micro-mirrors to reduce the desired reflectivity by the subset of mirrors. Each micro-mirror may be rotated by 5° to 15°, such as from 6° to 14°, such as from 7° to 13° and including from being rotated by 8° to 12°. In still other embodiments, light detection systems are configured to differentially detect light by inactivating (e.g., galvanically inactivating) a subset of micro-mirrors on the digital micro-mirror device. Any suitable protocol may be used to inactive the subset of micro-mirrors, such as where an electric current is applied to the subset of micro-mirrors sufficient to reduce or eliminate the reflectivity of the micro-mirrors, for example where the applied electric current is sufficient to reduce the reflectivity of the subset of micro-mirrors by 50% or more, such as by 75% or more, such as by 90% or more, such as by 95% or more, such as by 97% or more, such as by 99% or more and including reducing the reflectivity of the subset of micro-mirrors by 100%.

The number of micro-mirrors modulated to differentially detect light from the sample in the flow cell will vary depending on the type of light being differentially detected or being obscured. In some embodiments, the subset of modulated micro-mirrors on the active surface of the digital micro-mirror device may include 5% or more of the micro-mirrors on the digital micro-mirror device active surface may be modulated, such as 10% or more, such as 25% or more, such as 50% or more, such as 75% or more and including 90% or more of the micro-mirrors on the digital micro-mirror device active surface may be modulated. The subset of micro-mirrors that are modulated may be in the form of one or more predetermined patterns on the digital micro-mirror device active surface, such as a rectilinear pattern, e.g., squares, rectangles, trapezoids, triangles, hexagons, etc., curvilinear patterns, e.g., circles, ovals, as well as asymmetric patterns, irregular patterns, e.g., a parabolic bottom portion coupled to a planar top portion. In other embodiments, the subset of micro-mirrors that are modulated to differentially detect light from the sample is positioned along one or more lines across the surface of the digital micro-mirror device.

In some embodiments, light collection systems of interest include a subset of micro-mirrors on the active surface of the digital micro-mirror device that are modulated to distinguish light from different particles in the sample, such as light emanating from different cells in the sample. In these embodiments, a subset of micro-mirrors may be tilted, rotated or inactivated to obscure light from undesired components of the sample, such as scatter light from undesired cell populations, cell fragments, impurities or non-cellular components in the sample. For instance, where it is desired to specifically characterize two different populations of cells in the sample, only the micro-mirrors of the digital micro-mirror device that correspond to the light from these cell populations may be activated and the other micro-mirrors on digital micro-mirror device may be inactivated to obscure light from the other undesired cell populations in the sample. As such, the detector unit in the subject light collection systems may be configured to specifically characterize 1 or more different cell populations in a sample having a plurality of different cell populations, such as 2 or more different cell populations, such as 3 or more, such as 4 or more, such as 5 or more, such as 6 or more, such as 7 or more and including 10 or more different cell populations in the sample having a plurality of different cell populations.

In other embodiments, light collection systems of interest include a subset of micro-mirrors on the active surface of the digital micro-mirror device that are modulated to obscure unwanted light from being propagated to the detector surface. For example, a subset of micro-mirrors may be modulated to obscure incident light from the irradiating light source from being propagated to the detector surface. In these embodiments, the subset of modulated micro-mirrors may be in the form of one or more lines across the digital micro-mirror surface which corresponds to the scattered or otherwise unblocked incident light from the irradiating light source.

The subset of micro-mirrors on the active surface of the digital micro-mirror that are modulated at any given time may include any suitable number of micro-mirrors, such as 10 micro-mirrors or more, such as 25 micro-mirrors or more, such as 50 micro-mirrors or more, such as 100 micro-mirrors or more, such as 250 micro-mirrors or more, such as 500 micro-mirrors or more, such as 1000 micro-mirrors or more, such as 2500 micro-mirrors or more and including 5000 micro-mirrors or more. As such, the subset of micro-mirrors that are modulated to differentially detect light from the sample in the flow cell may be from 5% to 75% of the total number of micro-mirrors on the active surface of the digital micro-mirror device, such as from 10% to 70%, such as from 15% to 65%, such as from 20% to 60% and including from 25% to 50% of the total number of micro-mirrors on the active surface of the digital micro-mirror device. Depending on the total size of the active surface of the digital micro-mirror device, the subset of micro-mirrors being modulated to differentially detect light from the sample in the flow cell may have a length that ranges from 0.01 mm to 25 mm, such as from 0.05 mm to 20 mm, such as from 0.1 mm to 15 mm, such as from 0.5 mm to 10 mm, such as from 1 mm to 9 mm and including from 2 mm to 8 mm. The width of the subset of micro-mirrors being modulated to differentially detect light from the sample may also range from 0.01 mm to 25 mm, such as from 0.05 mm to 20 mm, such as from 0.1 mm to 15 mm, such as from 0.5 mm to 10 mm, such as from 1 mm to 9 mm and including from 2 mm to 8 mm. In embodiments, depending on the pattern of the subset of micro-mirrors being modulated to differentially detect light from the sample, the modulated subset of micro-mirrors may occupy a surface area on the digital micro-mirror device of from 0.1 mm$^2$ to 500 mm$^2$, such as from 0.5 mm$^2$ to 450 mm$^2$, such as from 1 mm$^2$ to 400 mm$^2$, such as from 2 mm$^2$ to 350 mm$^2$, such as from 3 mm$^2$ to 300 mm$^2$, such as from 4 mm$^2$ to 250 mm$^2$, such as from 5 mm$^2$ to 200 mm$^2$ and including from 10 mm$^2$ to 100 mm$^2$.

In certain embodiments, a subset of the micro-mirrors on the active surface of the digital micro-mirror device are dynamically modulated, such that one or more of the micro-mirrors are tilted, rotated or inactivated for a desired duration, for example, for 0.001 μs or more, such as 0.01 μs or more, such as 0.1 μs or more, such as 0.5 μs or more, such as 1 μs or more, such as 5 μs or more, such as 10 μs or more, such as 25 μs or more, such as 50 μs or more, such as 100 μs or more, such as 500 μs or more and including for 1000 μs or more. In certain embodiments, a subset of the micro-mirrors on the active surface of the digital micro-mirror device is dynamically modulated for an extended period of time, such as for 1 second or more, such as 5 seconds or more, such as 10 seconds or more, such as 15 seconds or more, such as 30 seconds or more, such as 60 seconds or more, such as 120 seconds or more, such as 240 seconds or more, such as 360 seconds or more, such as 480 seconds or more and including for 600 seconds or more. In certain instances, the subset of micro-mirrors are dynamically modulated for the entire duration that the sample in the flow cell is irradiated with the light source.

Figure 2:
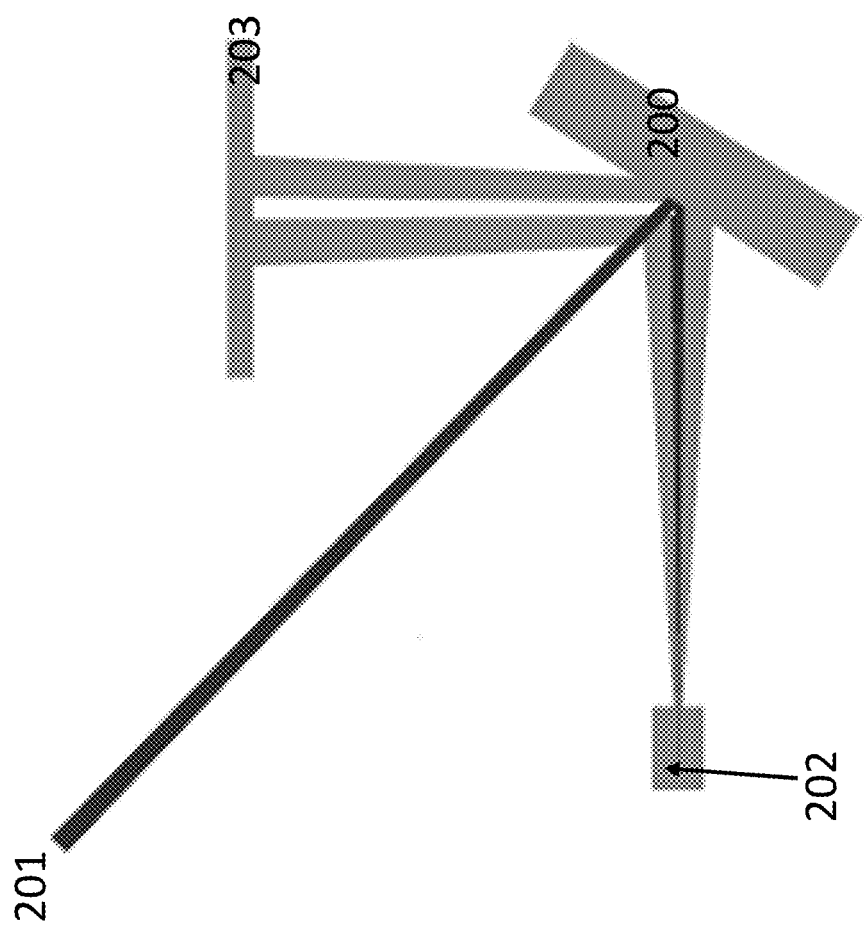
FIG. 2 depicts a light collection system configured to differentially detect light from a sample in a flow cell with a digital micro-mirror device according to certain embodiments.

FIG. 2 depicts a light collection system configured to differentially detect light from a sample in a flow cell by modulating a subset of micro-mirrors on the active surface of a digital micro-mirror device according to certain embodiments. Light source 201 irradiates the digital micro-mirror device 200 which reflects light to the sample in flow cell 202. Light from the sample in flow cell 202 (e.g., forward scattered light) is propagated back to the digital micro-mirror device and reflected to detector 203. By modulating the micro-mirrors on irradiated by light source 201 to only reflect light from digital micro-mirror device 200 to flow cell 202 and not back to detector 203, incident light (e.g., laser scatter) can be obscured from being collected and detected by detector 203.

Light collection systems configured to differentially detect light from the sample in the flow cell according to embodiments also include a detector. Detectors of interest may include, but are not limited to optical sensors or photodetectors, such as active-pixel sensors (APSs), avalanche photodiode, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, the transmitted light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors.

In some embodiments, detectors of interest for differentially detect light from a sample in a flow cell include a plurality of detectors. In some instances, the detector unit includes solid-state detectors such as photodiodes. In certain instances, the detector unit includes a photodetector array, such as an array of photodiodes. In these embodiments, the photodetector array may include 4 or more photodetectors, such as 10 or more photodetectors, such as 25 or more photodetectors, such as 50 or more photodetectors, such as 100 or more photodetectors, such as 250 or more photodetectors, such as 500 or more photodetectors, such as 750 or more photodetectors and including 1000 or more photodetectors. For example, the detector may be a photodiode array having 4 or more photodiodes, such as 10 or more photodiodes, such as 25 or more photodiodes, such as 50 or more photodiodes, such as 100 or more photodiodes, such as 250 or more photodiodes, such as 500 or more photodiodes, such as 750 or more photodiodes and including 1000 or more photodiodes.

The photodetectors may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular patterned configurations. The photodetectors in the photodetector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°. The photodetector array may be any suitable shape and may be a rectilinear shape, e.g., squares, rectangles, trapezoids, triangles, hexagons, etc., curvilinear shapes, e.g., circles, ovals, as well as irregular shapes, e.g., a parabolic bottom portion coupled to a planar top portion. In certain embodiments, the photodetector array has a rectangular-shaped active surface.

Each photodetector (e.g., photodiode) in the array may have an active surface with a width that ranges from 5 μm to 250 μm, such as from 10 μm to 225 μm, such as from 15 μm to 200 μm, such as from 20 μm to 175 μm, such as from 25 μm to 150 μm, such as from 30 μm to 125 μm and including from 50 μm to 100 μm and a length that ranges from 5 μm to 250 μm, such as from 10 μm to 225 μm, such as from 15 μm to 200 μm, such as from 20 μm to 175 μm, such as from 25 μm to 150 μm, such as from 30 μm to 125 μm and including from 50 μm to 100 μm, where the surface area of each photodetector (e.g., photodiode) in the array ranges from 25 to μm$^2$ to 10000 μm$^2$, such as from 50 to μm$^2$ to 9000 μm$^2$, such as from 75 to μm$^2$ to 8000 μm$^2$, such as from 100 to μm$^2$ to 7000 μm$^2$, such as from 150 to μm$^2$ to 6000 μm$^2$ and including from 200 to μm$^2$ to 5000 μm$^2$.

The size of the photodetector array may vary depending on the amount of light propagated from the sample in the flow cell, the number of photodetectors and the desired sensitivity and may have a length that ranges from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. The width of the photodetector array may also vary, ranging from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. As such, the active surface of the photodetector array may range from 0.1 mm$^2$ to 10000 mm$^2$, such as from 0.5 mm² to 5000 mm², such as from 1 mm² to 1000 mm², such as from 5 mm² to 500 mm², and including from 10 mm² to 100 mm².

In some embodiments, each photodetector in the photodetector array may be individually modulated, such that light from the sample may be differentially detected by the detectors in the array. In some instances, a subset of photodetectors may be modulated, such as a group of photodetectors in a particular region of the array or a subset of photodetectors that form a predetermined pattern or shape, such as lines across the photodetector array. For example, each photodetector in the array may be inactivated (reversibly or irreversibly) as desired depending on the sample being interrogated such that different regions of the photodetector array may be configured to detect light differently. In some embodiments, one or more photodetectors in the array may be partially or fully inactivated such that the photodetectors in a particular region of the array are configured to detect a reduced amount of light, such as where the photodetector detects 95% or less of the light impinging the surface of the photodetector in a particular region, such as 90% or less, such as 85% or less, such as 75% or less, such as 50% or less, such as 25% or less, such as 10% or less, such as 5% or less, such as 3% or less, such as 1% or less and including 0.1% or less of the light that impinges the surface of the photodetector in a particular region. In certain instances, a subset of photodetectors in the photodetector array are inactivated such that no light by the photodetectors in the subset is detected.

The number of photodetectors modulated to differentially detect light from the sample in the flow cell will vary depending on the type of light being differentially detected or being obscured. In some embodiments, the subset of modulated photodetectors in the photodetector array may include 5% or more of the photodetectors in the photodetector array, such as 10% or more, such as 25% or more, such as 50% or more, such as 75% or more and including 90% or more of the photodetectors in the photodetector array may be modulated. The subset of photodetectors may be in the form of one or more predetermined patterns in the photodetector array, such as a rectilinear pattern, e.g., squares, rectangles, trapezoids, triangles, hexagons, etc., curvilinear patterns, e.g., circles, ovals, as well as asymmetric patterns, irregular patterns, e.g., a parabolic bottom portion coupled to a planar top portion. In other embodiments, the subset of photodetectors that are modulated to differentially detect light from the sample is positioned along one or more lines across the photodetector array.

In some embodiments, light collection systems of interest include a subset of photodetectors in the photodetector array that are modulated to distinguish light from different particles in the sample, such as light emanating from different cells in the sample. In these embodiments, a subset of photodetectors may be partially or fully inactivated to obscure light from undesired components of the sample, such as scatter from undesired cell populations, cell fragments, impurities or non-cellular components in the sample. For instance, where it is desired to specifically characterize two different populations of cells in the sample, only the photodetectors in the photodetector array that correspond to the light from these cell populations may be activated and the other photodetectors in the photodetector array may be inactivated to obscure light emanating from the other undesired cell populations in the sample. As such, the detector unit in the subject light collection systems may be configured to specifically characterize 1 or more different cell populations in a sample having a plurality of different cell populations, such as 2 or more different cell populations, such as 3 or more, such as 4 or more, such as 5 or more, such as 6 or more, such as 7 or more and including 10 or more different cell populations in the sample having a plurality of different cell populations.

In other embodiments, light collection systems of interest include a subset of photodetectors in the photodetector array that are partially or fully inactivated to obscure unwanted light from being detected by the photodetector array. For example, a subset of photodetectors may be partially or fully inactivated to obscure incident light from the irradiating light source from detected by the detector. In these embodiments, the subset of inactivated photodetectors may be in the form of one or more lines across the photodetector array which corresponds to the scattered or otherwise unblocked incident light from the irradiating light source.

The subset of photodetectors in the photodetector array that are partially or fully inactivated at any given time may include any suitable number of photodetectors, such as 10 photodetectors or more, such as 25 photodetectors or more, such as 50 photodetectors or more, such as 100 photodetectors or more, such as 250 photodetectors or more, such as 500 photodetectors or more, such as 1000 photodetectors or more, such as 2500 photodetectors or more and including 5000 photodetectors or more. As such, the subset of photodetectors that are partially or fully inactivated to differentially detect light from the sample in the flow cell may be 5% to 75% of the total number of photodetectors in the photodetector array, such as from 10% to 70%, such as from 15% to 65%, such as from 20% to 60% and including from 25% to 50% of the total number of photodetectors in the photodetector array. Depending on the total size of the photodetector array, the subset of photodetectors that are partially or fully inactivated to differentially detect light from the sample in the flow cell may have a length that ranges from 0.01 mm to 25 mm, such as from 0.05 mm to 20 mm, such as from 0.1 mm to 15 mm, such as from 0.5 mm to 10 mm, such as from 1 mm to 9 mm and including from 2 mm to 8 mm. The width of the subset of photodetectors that are partially or fully inactivated to differentially detect light from the sample may also range from 0.01 mm to 25 mm, such as from 0.05 mm to 20 mm, such as from 0.1 mm to 15 mm, such as from 0.5 mm to 10 mm, such as from 1 mm to 9 mm and including from 2 mm to 8 mm. In embodiments, depending on the pattern of the subset of photodetectors that are partially or fully inactivated to differentially detect light from the sample, the modulated subset of photodetector may occupy a surface area of from 0.1 mm² to 500 mm², such as from 0.5 mm² to 450 mm², such as from 1 mm² to 400 mm², such as from 2 mm² to 350 mm², such as from 3 mm² to 300 mm², such as from 4 mm² to 250 mm², such as from 5 mm² to 200 mm² and including from 10 mm² to 100 mm².

In certain embodiments, a subset of photodetectors in the photodetector array may be dynamically inactivated such that one or more of the photodetectors in the array are partially or fully inactivated for a desired duration (e.g., for the duration of a laser pulse), for example, for 0.001 µs or more, such as 0.01 µs or more, such as 0.1 µs or more, such as 0.5 µs or more, such as 1 µs or more, such as 5 µs or more, such as 10 µs or more, such as 25 µs or more, such as 50 µs or more, such as 100 µs or more, such as 500 µs or more and including 1000 µs or more. In certain embodiments, a subset of the photodetectors in the photodetector array may be dynamically inactivated for an extended period of time, such as for 1 second or more, such as 5 seconds or more, such as 10 seconds or more, such as 15 seconds or more, such as 30 seconds or more, such as 60 seconds or more, such as 120 seconds or more, such as 240 seconds or more, such as 360 seconds or more, such as 480 seconds or more and including for 600 seconds or more. In certain instances, the subset of photodetectors in the photodetector array are dynamically inactivated for the entire duration that the sample in the flow cell is irradiated with the light source.

Figure 3:
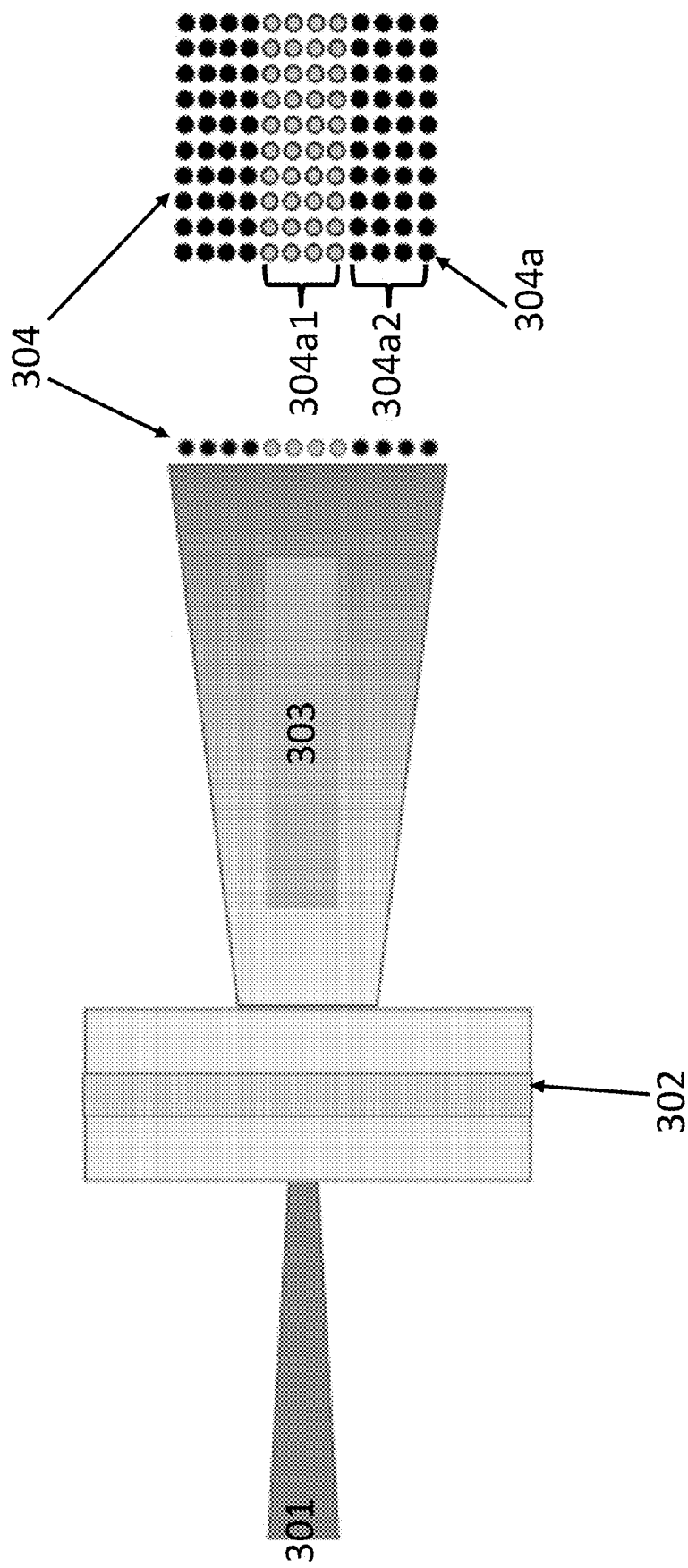
FIG. 3 depicts a light detection system for differentially detecting light from a sample in flow cell with a modulated photodetector array according to certain embodiments.

FIG. 3 depicts a light detection system for differentially detecting light from a sample in flow cell with a modulated photodetector array according to certain embodiments. Light from laser 301 irradiates a sample flowing through flow cell 302. Light emanating from the sample is collected by a tapered fused fiber optic component 303 and propagated to photodetector array 304 having a plurality of photodetectors 304a. Photodetector array 304 (front view) includes a subset of photodetectors 304a1 that are inactivated to reduce the amount of light from laser 301 that is detected by photodetector array 304. Photodetectors 304a2 are fully activated and are configured to detect light from the sample components from flow cell 302.

Figure 4:
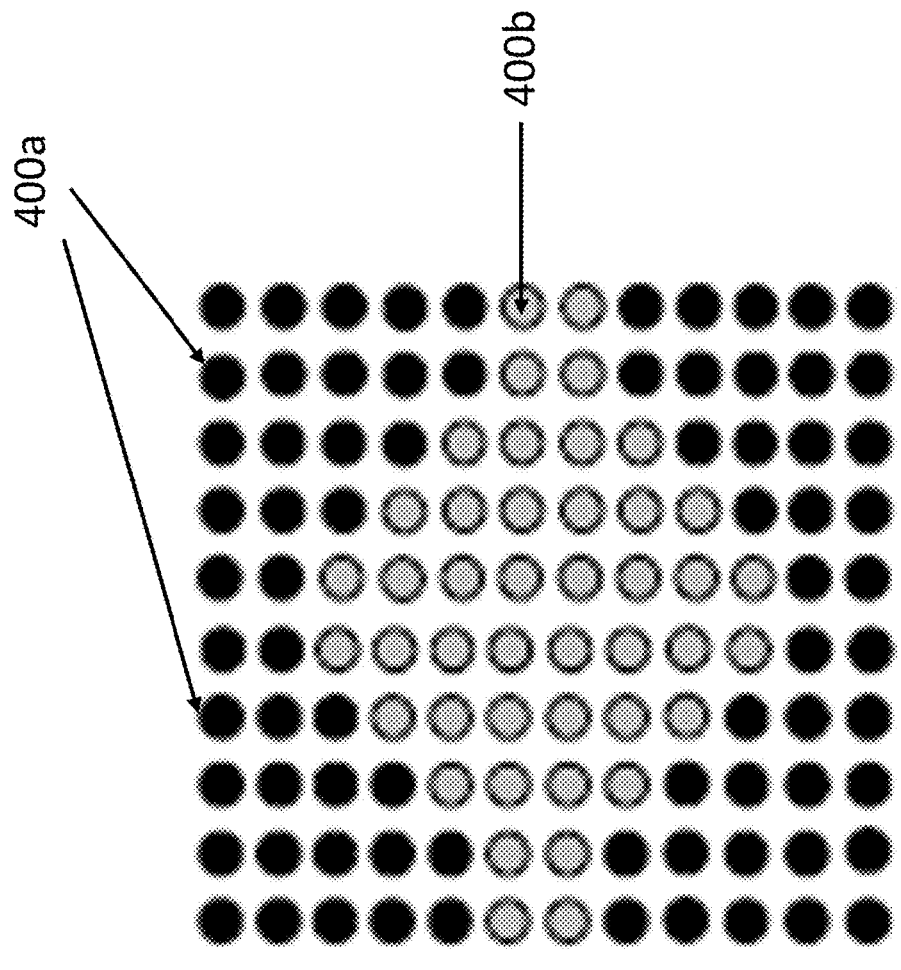
FIG. 4 depicts a front view of a photodetector array having activated and inactivated photodetectors in predetermined pattern according to certain embodiments.

FIG. 4 depicts a front view of a photodetector array 400 having activated and inactivated photodetectors in predetermined pattern according to certain embodiments. By inactivating photodetectors with a particular pattern, undesired light (e.g., from the incident irradiation source or from unwanted populations of cells in the sample) may be obscured. Photodetector array 400 includes activated photodetectors 400a and inactivated photodetectors 400b which are arranged in a distinct and predetermined pattern corresponding to the light which is desired to be masked.

Photodetectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths.

In some embodiments, photodetectors are configured to measure collected light over a range of wavelengths (e.g., 200 nm-1000 nm). In certain embodiments, photodetectors of interest are configured to collect spectra of light over a range of wavelengths. For example, systems may include one or more detectors configured to collect spectra of light over one or more of the wavelength ranges of 200 nm-1000 nm. In yet other embodiments, detectors of interest are configured to measure light from the sample in the flow stream at one or more specific wavelengths. For example, systems may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, photodetectors may be configured to be paired with specific fluorophores, such as those used with the sample in a fluorescence assay.

In embodiments, the light detection system is configured to measure light continuously or in discrete intervals. In some instances, photodetectors of interest are configured to take measurements of the collected light continuously. In other instances, the light detection system is configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Systems of interest for measuring light from a sample include an irradiating light source. In embodiments, the light source may be any suitable broadband or narrow band source of light. Depending on the components in the sample (e.g., cells, beads, non-cellular particles, etc.), the light source may be configured to emit wavelengths of light that vary, ranging from 200 nm to 1500 nm, such as from 250 nm to 1250 nm, such as from 300 nm to 1000 nm, such as from 350 nm to 900 nm and including from 400 nm to 800 nm. For example, the light source may include a broadband light source emitting light having wavelengths from 200 nm to 900 nm. In other instances, the light source includes a narrow band light source emitting a wavelength ranging from 200 nm to 900 nm. For example, the light source may be a narrow band LED (1 nm-25 nm) emitting light having a wavelength ranging between 200 nm to 900 nm. In some embodiments, the light source is a laser, such as continuous wave laser. For example, the laser may be a helium-neon (HeNe) laser. In certain embodiments, the light source is a laser in a flow cytometer.

In other embodiments, the light source is a non-laser light source, such as a lamp, including but not limited to a halogen lamp, deuterium arc lamp, xenon arc lamp, a light-emitting diode, such as a broadband LED with continuous spectrum, superluminescent emitting diode, semiconductor light emitting diode, wide spectrum LED white light source, an multi-LED integrated. In some instances the non-laser light source is a stabilized fiber-coupled broadband light source, white light source, among other light sources or any combination thereof.

The light source may be positioned any suitable distance from the sample (e.g., the flow stream in a flow cytometer), such as at a distance of 0.001 mm or more from the flow stream, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the light source irradiate the sample at any suitable angle (e.g., relative the vertical axis of the flow stream), such as at an angle ranging from 10° to 90°, such as from 15° to 85°, such as from 20° to 80°, such as from 25° to 75° and including from 30° to 60°, for example at a 90° angle.

The light source may be configured to irradiate the sample in the flow cell continuously or in discrete intervals. In some instances, systems include a light source that is configured to irradiate the sample continuously, such as with a continuous wave laser that continuously irradiates the flow stream at the interrogation point in a flow cytometer. In other instances, systems of interest include a light source that is configured to irradiate the sample at discrete intervals, such as every 0.001 milliseconds, every 0.01 milliseconds, every 0.1 milliseconds, every 1 millisecond, every 10 milliseconds, every 100 milliseconds and including every 1000 milliseconds, or some other interval. Where the light source is configured to irradiate the sample at discrete intervals, systems may include one or more additional components to provide for intermittent irradiation of the sample with the light source. For example, the subject systems in these embodiments may include one or more laser beam choppers, manually or computer controlled beam stops for blocking and exposing the sample to the light source.

In some embodiments, systems include a flow cell configured to propagate the sample in the flow stream. Any convenient flow cell which propagates a fluidic sample to a sample interrogation region may be employed, where in some embodiments, the flow cell includes a proximal cylindrical portion defining a longitudinal axis and a distal frustoconical portion which terminates in a flat surface having the orifice that is transverse to the longitudinal axis. The length of the proximal cylindrical portion (as measured along the longitudinal axis) may vary ranging from 1 mm to 15 mm, such as from 1.5 mm to 12.5 mm, such as from 2 mm to 10 mm, such as from 3 mm to 9 mm and including from 4 mm to 8 mm. The length of the distal frustoconical portion (as measured along the longitudinal axis) may also vary, ranging from 1 mm to 10 mm, such as from 2 mm to 9 mm, such as from 3 mm to 8 mm and including from 4 mm to 7 mm. The diameter of the of the flow cell nozzle chamber may vary, in some embodiments, ranging from 1 mm to 10 mm, such as from 2 mm to 9 mm, such as from 3 mm to 8 mm and including from 4 mm to 7 mm.

In certain instances, the flow cell does not include a cylindrical portion and the entire flow cell inner chamber is frustoconically shaped. In these embodiments, the length of the frustoconical inner chamber (as measured along the longitudinal axis transverse to the nozzle orifice), may range from 1 mm to 15 mm, such as from 1.5 mm to 12.5 mm, such as from 2 mm to 10 mm, such as from 3 mm to 9 mm and including from 4 mm to 8 mm. The diameter of the proximal portion of the frustoconical inner chamber may range from 1 mm to 10 mm, such as from 2 mm to 9 mm, such as from 3 mm to 8 mm and including from 4 mm to 7 mm.

In some embodiments, the sample flow stream emanates from an orifice at the distal end of the flow cell. Depending on the desired characteristics of the flow stream, the flow cell orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell of interest has a circular orifice. The size of the nozzle orifice may vary, in some embodiments ranging from 1 μm to 20000 μm, such as from 2 μm to 17500 μm, such as from 5 μm to 15000 μm, such as from 10 μm to 12500 μm, such as from 15 μm to 10000 μm, such as from 25 μm to 7500 μm, such as from 50 μm to 5000 μm, such as from 75 μm to 1000 μm, such as from 100 μm to 750 μm and including from 150 μm to 500 μm. In certain embodiments, the nozzle orifice is 100 μm.

In some embodiments, the flow cell includes a sample injection port configured to provide a sample to the flow cell. In embodiments, the sample injection system is configured to provide suitable flow of sample to the flow cell inner chamber. Depending on the desired characteristics of the flow stream, the rate of sample conveyed to the flow cell chamber by the sample injection port may be 1 μL/min or more, such as 2 μL/min or more, such as 3 μL/min or more, such as 5 μL/min or more, such as 10 μL/min or more, such as 15 μL/min or more, such as 25 μL/min or more, such as 50 μL/min or more and including 100 μL/min or more, where in some instances the rate of sample conveyed to the flow cell chamber by the sample injection port is 1 μL/sec or more, such as 2 μL/sec or more, such as 3 μL/sec or more, such as 5 μL/sec or more, such as 10 μL/sec or more, such as 15 μL/sec or more, such as 25 μL/sec or more, such as 50 μL/sec or more and including 100 μL/sec or more.

The sample injection port may be an orifice positioned in a wall of the inner chamber or may be a conduit positioned at the proximal end of the inner chamber. Where the sample injection port is an orifice positioned in a wall of the inner chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell inner chamber. For example, the sample injection port may be a conduit positioned to have the orifice of the sample injection port in line with the flow cell orifice. Where the sample injection port is a conduit positioned in line with the flow cell orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-section shape of the sample injection tube. For example, the orifice of the sample injection port may include a beveled tip having a bevel angle ranging from 1° to 10°, such as from 2° to 9°, such as from 3° to 8°, such as from 4° to 7° and including a bevel angle of 5°.

In some embodiments, the flow cell also includes a sheath fluid injection port configured to provide a sheath fluid to the flow cell. In embodiments, the sheath fluid injection system is configured to provide a flow of sheath fluid to the flow cell inner chamber, for example in conjunction with the sample to produce a laminated flow stream of sheath fluid surrounding the sample flow stream. Depending on the desired characteristics of the flow stream, the rate of sheath fluid conveyed to the flow cell chamber by the may be 25 μL/sec or more, such as 50 μL/sec or more, such as 75 μL/sec or more, such as 100 μL/sec or more, such as 250 μL/sec or more, such as 500 μL/sec or more, such as 750 μL/sec or more, such as 1000 μL/sec or more and including 2500 μL/sec or more.

In some embodiments, the sheath fluid injection port is an orifice positioned in a wall of the inner chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In certain embodiments, the subject systems are flow cytometric systems employing the above described light detection system for detecting light emitted by a sample in a flow stream. Suitable flow cytometry systems and methods for analyzing samples include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem*. January; 49(pt 1):17-28; Linden, et. al., *Semin Throm Hemost*. 2004 October; 30(5):502-11; Alison, et al. *J Pathol*, 2010 December; 222(4):335-344; and Herbig, et al. (2007) *Crit Rev Ther Drug Carrier Syst*. 24(3): 203-255; the disclosures of which are incorporated herein by reference. In certain instances, flow cytometry systems of interest include BD Biosciences FACSCanto™ flow cytometer, BD Biosciences FACSVantage™, BD Biosciences FACSort™, BD Biosciences FACSCount™, BD Biosciences FACScan™, and BD Biosciences FACSCalibur™ systems, a BD Biosciences Influx™ cell sorter, BD Biosciences Jazz™ cell sorter and BD Biosciences Aria™ cell sorter or the like.

In certain embodiments, the subject systems are flow cytometer systems which incorporate one or more components of the flow cytometers described in U.S. Pat. Nos. 3,960,449; 4,347,935; 4,667,830; 4,704,891; 4,770,992; 5,030,002; 5,040,890; 5,047,321; 5,245,318; 5,317,162; 5,464,581; 5,483,469; 5,602,039; 5,620,842; 5,627,040; 5,643,796; 5,700,692; 6,372,506; 6,809,804; 6,813,017; 6,821,740; 7,129,505; 7,201,875; 7,544,326; 8,140,300; 8,233,146; 8,753,573; 8,975,595; 9,092,034; 9,095,494 and 9,097,640; the disclosures of which are herein incorporated by reference.

In some embodiments, one or more of the optical adjustment component (e.g., digital micro-mirror device) and the detector (e.g., photodetector array) may be computer controlled where the subset of micro-mirrors or photodetectors that are modulated (e.g., activated, inactivated, tilted, rotated, etc.) may be configured for complete automation or partial automation. In some embodiments, the subject systems include a computer having a computer readable storage medium with a computer program stored thereon, where the computer program when loaded on the computer includes instructions for modulating (e.g., tilting, rotating, inactivating such as by applying an electric current) one or more micro-mirrors on the active surface of the digital micro-mirror device. In other embodiments, the subject systems include a computer having a computer readable storage medium with a computer program stored thereon, where the computer program when loaded on the computer includes instructions for activating or inactivating (partially or fully) one or more photodetectors in the photodetector array.

The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for modulating (e.g., tilting, rotating, inactivating such as by applying an electric current) one or more micro-mirrors on the active surface of the digital micro-mirror device or for activating or inactivating (partially or fully) one or more photodetectors in the photodetector array.

The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid state storage devices (including magnetic or optical disks or tape or RAM, or any other suitable device, either fixed or portable). The processor may include a general purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction therewith, in managing the treatment of a health condition, such as HIV, AIDS or anemia.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows NT®, Windows XP, Windows 7, Windows 8, iOS, Sun Solaris, Linux, OS/400, Compaq Tru64 Unix, SGI IRIX, Siemens Reliant Unix, and others.

Methods for Differentially Detecting Light From an Irradiated Sample

Aspects of the disclosure also include methods for differentially detecting light from a sample (e.g., in the flow stream in a flow cytometer). In practicing methods according to embodiments, a sample is irradiated with a light source and light from the sample is detected with the light detection systems as described above. In some embodiments, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

In practicing the subject methods, a sample (e.g., in a flow stream of a flow cytometer) is irradiated with light from a light source. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Where methods include irradiating with a broadband light source, broadband light source protocols of interest may include, but are not limited to, a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof.

In other embodiments, methods includes irradiating with a narrow band light source emitting a particular wavelength or a narrow range of wavelengths, such as for example with a light source which emits light in a narrow range of wavelengths like a range of 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Where methods include irradiating with a narrow band light source, narrow band light source protocols of interest may include, but are not limited to, a narrow wavelength LED, laser diode or a broadband light source coupled to one or more optical bandpass filters, diffraction gratings, monochromators or any combination thereof.

In certain embodiments, methods include irradiating the sample with one or more lasers. As discussed above, the type and number of lasers will vary depending on the sample as well as desired light collected and may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In others instances, the methods include irradiating the flow stream with a dye laser, such as a stilbene, coumarin or rhodamine laser. In yet other instances, methods include irradiating the sample in the flow cell with a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, methods include irradiating the flow stream with a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

The sample may be irradiated with one or more of the above mentioned light sources, such as 2 or more light sources, such as 3 or more light sources, such as 4 or more light sources, such as 5 or more light sources and including 10 or more light sources. The light source may include any combination of types of light sources. For example, in some embodiments, the methods include irradiating the sample in the flow stream with an array of lasers, such as an array having one or more gas lasers, one or more dye lasers and one or more solid-state lasers.

The sample may be irradiated with wavelengths ranging from 200 nm to 1500 nm, such as from 250 nm to 1250 nm, such as from 300 nm to 1000 nm, such as from 350 nm to 900 nm and including from 400 nm to 800 nm. For example, where the light source is a broadband light source, the sample may be irradiated with wavelengths from 200 nm to 900 nm. In other instances, where the light source includes a plurality of narrow band light sources, the sample may be irradiated with specific wavelengths in the range from 200 nm to 900 nm. For example, the light source may be plurality of narrow band LEDs (1 nm-25 nm) each independently emitting light having a range of wavelengths between 200 nm to 900 nm. In other embodiments, the narrow band light source includes one or more lasers (such as a laser array) and the sample is irradiated with specific wavelengths ranging from 200 nm to 700 nm, such as with a laser array having gas lasers, excimer lasers, dye lasers, metal vapor lasers and solid-state laser as described above.

Where more than one light source is employed, the sample may be irradiated with the light sources simultaneously or sequentially, or a combination thereof. For example, the sample may be simultaneously irradiated with each of the light sources. In other embodiments, the flow stream is sequentially irradiated with each of the light sources. Where more than one light source is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the sample with the light source (e.g. laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where sample is sequentially irradiated with two or more light sources, the duration sample is irradiated by each light source may be the same or different.

The time period between irradiation by each light source may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each light source is 10 microseconds. In embodiments where sample is sequentially irradiated by more than two (i.e., 3 or more) light sources, the delay between irradiation by each light source may be the same or different.

The sample may be irradiated continuously or in discrete intervals. In some instances, methods include irradiating the sample in the sample with the light source continuously. In other instances, the sample in is irradiated with the light source in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the light source, the sample may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

As discussed above, in embodiments light from the irradiated sample is conveyed to a light detection system as described herein and measured by one or more photodetectors. In practicing the subject methods according to certain embodiments, light is propagated from the sample in the flow cell to an optical adjustment component. The optical adjustment component in certain embodiments is employed to optically change one or more properties of the light, such as the beam path, direction, focus or collimation of the light. Optical adjustment components may include, but are not limited to, lenses (e.g., focusing, objective, magnifying, etc.), collimators, mirrors (e.g., dichroic mirrors), slits, pinholes, filters (e.g., bandpass, interference), diffraction gratings, monochromators, among other types of optical adjustment components. In some embodiments, light emanating from the sample is propagated with a fused fiber optics component, such as a tapered fused fiber optic component. In some embodiments the fused fiber optics component is coupled to the detector with a light conducting material, such as a gel between the fused fiber optic bundle and the detector surface.

In some embodiments, methods include propagating light from the sample to micro-opto-electro-mechanical system (MOEMS), such as a digital micro-mirror device having a plurality of micro-mirrors on the active surface of the digital micro-mirror device. To differentially detect light from the irradiated sample according to some embodiments, methods further include modulating one or more of the micro-mirrors, such as by tilting, rotating or inactivating the micro-mirrors. The micro-mirrors may be modulated such that the reflectivity of the modulated mirrors is reduced by % or more, such as by 2% or more, such as by 3% or more, such as by 5% or more, such as by 10% or more, such as by 15% or more, such as by 25% or more, such as by 50% or more, such as by 75% or more, such as by 90% or more, such as by 95% or more, such as by 97% or more, such as by 99% or more and including reducing the reflectivity of the micro-mirror by 100%.

In these embodiments, a subset of micro-mirrors of the digital micro-mirror device may be modulated. In practicing the subject methods, the number of modulated micro-mirrors may be vary depending on the size of the digital micro-mirror device and the amount of light that is desired to be obscured and may be 10 micro-mirrors or more, such as 25 micro-mirrors or more, such as 50 micro-mirrors or more, such as 100 micro-mirrors or more, such as 250 micro-mirrors or more, such as 500 micro-mirrors or more, such as 1000 micro-mirrors or more, such as 2500 micro-mirrors or more and including 5000 micro-mirrors or more. As described above, the subset of micro-mirrors that are modulated to differentially detect light from the sample may be from 5% to 75% of the total number of micro-mirrors on the active surface of the digital micro-mirror device, such as from 10% to 70%, such as from 15% to 65%, such as from 20% to 60% and including from 25% to 50% of the total number of micro-mirrors on the active surface of the digital micro-mirror device. The subset of micro-mirrors that are modulated may be in the form of one or more predetermined shapes on the digital micro-mirror device active surface, such as a rectilinear pattern, e.g., squares, rectangles, trapezoids, triangles, hexagons, etc., curvilinear patterns, e.g., circles, ovals, as well as asymmetric patterns, irregular patterns, e.g., a parabolic bottom portion coupled to a planar top portion. In other embodiments, methods include modulating one or more lines of micro-mirrors across the digital micro-mirror device to differentially detect light from the sample.

To modulate the subset of micro-mirrors, in some embodiments methods include tilting each micro-mirror to reduce the desired reflectivity of the mirrors. Each micro-mirror may be tilted by 5° to 15° with respect to the surface of the digital micro-mirror device, such as from 6° to 14°, such as from 7° to 13° and including from being tilted by 8° to 12° with respect to the surface of the digital micro-mirror device. In other embodiments, methods include rotating a subset of micro-mirrors to reduce the desired reflectivity by the subset of mirrors. Each micro-mirror may be rotated by 5° to 15°, such as from 6° to 14°, such as from 7° to 13° and including from being rotated by 8° to 12°. In yet other embodiments, methods include inactivating, such as by galvanically inactivating the subset of micro-mirrors. Any suitable inactivation protocol may be employed, such as by applying an electric current is sufficient to reduce the reflectivity of the subset of micro-mirrors by 50% or more, such as by 75% or more, such as by 90% or more, such as by 95% or more, such as by 97% or more, such as by 99% or more and including reducing the reflectivity of the subset of micro-mirrors by 100%.

In certain embodiments, methods include modulating a subset of micro-mirrors on the active surface of the digital micro-mirror device to distinguish light from different particles in the sample, such as a sample having a plurality of different types of cells. In some instances, methods include tilting, rotating or inactivating a subset of micro-mirrors to obscure light from undesired components of the sample, such as scatter light from undesired cell populations, cell fragments, impurities or non-cellular components in the sample. For example, where it is desired to specifically characterize two different populations of cells in the sample, methods include modulating (e.g., tilting, rotating or inactivating) the micro-mirrors corresponding to the light from the undesired cell populations in the sample and retaining as active the micro-mirrors of the digital micro-mirror device that correspond to the light from the desired cell populations. Methods may include characterizing 1 or more different cell populations in a sample having a plurality of different cell populations, such as 2 or more different cell populations, such as 3 or more, such as 4 or more, such as 5 or more, such as 6 or more, such as 7 or more and including 10 or more different cell populations in the sample having a plurality of different cell populations.

In other embodiments, methods include modulating a subset of micro-mirrors on the digital micro-mirror device to obscure unwanted light (e.g., incident irradiated light) from being propagated to the detector surface. For example, the subset of micro-mirrors may be tilted, rotated or inactivated to obscure light in the form of one or more lines or a predetermined pattern or shape across the digital micro-mirror surface.

In practicing the subject methods, the subset of the micro-mirrors on the active surface of the digital micro-mirror device may be dynamically modulated, where the micro-mirrors are tilted, rotated or inactivated for a desired duration, for example, for 0.001 µs or more, such as 0.01 µs or more, such as 0.1 µs or more, such as 0.5 µs or more, such as 1 µs or more, such as 5 µs or more, such as 10 µs or more, such as 25 µs or more, such as 50 µs or more, such as 100 µs or more, such as 500 µs or more and including for 1000 µs or more. In certain embodiments, a subset of the micro-mirrors on the active surface of the digital micro-mirror device is dynamically modulated for an extended period of time, such as for 1 second or more, such as 5 seconds or more, such as 10 seconds or more, such as 15 seconds or more, such as 30 seconds or more, such as 60 seconds or more, such as 120 seconds or more, such as 240 seconds or more, such as 360 seconds or more, such as 480 seconds or more and including for 600 seconds or more. In certain instances, methods include dynamically modulating the subset of micro-mirrors for the entire duration that the sample in the flow cell is irradiated with the light source.

In some embodiments, methods include differentially detecting light from the sample with a photodetector array. As discussed above, photodetector arrays include a plurality of photodetectors, such as 4 or more photodetectors, such as 10 or more photodetectors, such as 25 or more photodetectors, such as 50 or more photodetectors, such as 100 or more photodetectors, such as 250 or more photodetectors, such as 500 or more photodetectors, such as 750 or more photodetectors and including 1000 or more photodetectors. To differentially detect light with the photodetector array, a subset of photodetectors may be inactivated (reversibly or irreversibly) such that different regions of the photodetector array may be configured to detect light differently. Methods may include fully inactivating one or more of the photodetectors in the subset. In other embodiments, methods include partially inactivating one or more of the photodetectors in the subset. For example, methods may include inactivating one or more of the photodetectors such that the photodetector detects 95% or less of the light impinging the surface of the photodetector in a particular region, such as 90% or less, such as 85% or less, such as 75% or less, such as 50% or less, such as 25% or less, such as 10% or less, such as 5% or less, such as 3% or less, such as 1% or less and including 0.1% or less of the light that impinges the surface of the photodetector in a particular region. Depending on the number of photodetectors in the array, methods may include inactivating 5% or more of the photodetectors in the photodetector array, such as 10% or more, such as 25% or more, such as 50% or more, such as 75% or more and including 90% or more of the photodetectors in the photodetector array. The inactivated photodetectors may be in the form of one or more predetermined patterns in the photodetector array, such as a rectilinear pattern, e.g., squares, rectangles, trapezoids, triangles, hexagons, etc., curvilinear patterns, e.g., circles, ovals, as well as asymmetric patterns, irregular patterns, e.g., a parabolic bottom portion coupled to a planar top portion. In other embodiments, methods include inactivating a subset of photodetectors along one or more lines across the photodetector array.

In some embodiments, methods include inactivating a subset of photodetectors in the photodetector array to distinguish light from different particles in the sample, such as light emanating from different cells in the sample. In these embodiments, methods include partially or fully inactivating a subset of photodetectors to obscure light from undesired components of the sample, such as scatter from undesired cell populations, cell fragments, impurities or non-cellular components in the sample. For instance, where it is desired to specifically characterize two different populations of cells in the sample, only the photodetectors in the photodetector array that correspond to the light from these cell populations may be activated and the other photodetectors in the photodetector array may be inactivated to obscure light emanating from the other undesired cell populations in the sample.

In other embodiments, methods include inactivating a subset of photodetectors in the photodetector array to obscure unwanted light from being detected by the photodetector array. For example, methods may include partially or inactivating a subset of photodetectors to obscure incident light from the irradiating light source from detected by the detector. In these embodiments, methods may include partially or fully inactivating a subset of photodetectors in the form of one or more lines across the photodetector array which corresponds to the scattered or otherwise unblocked incident light from the irradiating light source.

Light impinged on the surface of each activated photodetector in the photodetector array may be measured at one or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring the collected light at 400 or more different wavelengths.

In some embodiments, methods include measuring the detected light over a range of wavelengths (e.g., 200 nm-1000 nm). For example, methods may include collecting spectra of light over one or more of the wavelength ranges of 200 nm-1000 nm. In yet other embodiments, methods include measuring collected light at one or more specific wavelengths. For example, the collected light may be measured at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof.

The detected light may be measured continuously or in discrete intervals. In some instances, methods include taking measurements of the light continuously. In other instances, the light is measured in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the collected light may be taken one or more times during the subject methods, such as 2 or more times, such as 3 or more times, such as 5 or more times and including 10 or more times. In certain embodiments, the light propagation is measured 2 or more times, with the data in certain instances being averaged.

Kits

Aspects of the invention further include kits, where kits include a flow cell configured to propagate a sample in a flow stream, an optical adjustment component (e.g., beam splitter, collimating lenses, mirrors, wavelength separators, pinholes, etc.) and a configured to differentially detect light from the flow stream without a scatter bar as described above. In some embodiments, the subject kits include fiber optics such as a tapered fused fiber optics bundle. In other embodiments, kits may include a digital micro-mirror device. In still other embodiments, kits may include a photodetector array, such as an avalanche photodiode array.

In some embodiments, kits include a fluidic composition, such as a digestive enzyme composition or buffer solution. Example buffers may include but are not limited to PBS (phosphate) buffer, acetate buffer, N,N-bis(2-hydroxyethyl) glycine (Bicine) buffer, 3-{[tris(hydroxymethyl)methyl] amino}propanesulfonic acid (TAPS) buffer, 2-(N-morpholino)ethanesulfonic acid (MES) buffer, citrate buffer, tris(hydroxymethyl)methylamine (Tris) buffer, N-tris(hydroxymethyl)methylglycine (Tricine) buffer, 3-[N-Tris(hydroxymethyl)methylamino]-2-hydroxypropanesulfonic Acid (TAPSO) buffer, 4-2-hydroxyethyl-1-piperazineethanesulfonic acid (HEPES) buffer, 2-{[tris(hydroxymethyl)methyl]amino}ethanesulfonic acid (TES) buffer, piperazine-N,N'-bis(2-ethanesulfonic acid) (PIPES) buffer, dimethylarsinic acid (Cacodylate) buffer, saline sodium citrate (SSC) buffer, 2(R)-2-(methylamino)succinic acid (succinic acid) buffer, potassium phosphate buffer, N-Cyclohexyl-2-aminoethanesulfonic acid (CHES) buffer, among other types of buffered solutions. In certain instances, the fluidic composition is a cytometer-grade solution.

In still other embodiments, kits include a labelling reagent composition. For example, the labelling reagent composition may be a fluorophore, chromophore, enzyme, redox label, radiolabels, acoustic label, Raman (SERS) tag, mass tag, isotope tag, magnetic particle, microparticle or nanoparticle or a combination thereof. In some cases, the labelling reagent includes a labelled biomolecule, such as a polypeptide, a nucleic acid and a polysaccharide that is labelled with a fluorophore, chromophore, enzyme, redox label, radiolabels, acoustic label, Raman (SERS) tag, mass tag, isotope tag, magnetic particle, microparticle or nanoparticle or a combination thereof.

The various assay components of the kits may be present in separate containers, or some or all of them may be pre-combined. For example, in some instances, one or more components of the kit, e.g., flow cell, digital micro-mirror device, photodetector array is present in a sealed pouch, e.g., a sterile foil pouch or envelope.

In addition to the above components, the subject kits may further include (in certain embodiments) instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject light collection systems for differentially detecting light from a sample in a flow cell find use in a variety of applications. In certain embodiments, the subject light collection systems finds use in enhancing measurements of light from a sample (e.g., fluorescence or scattered light from a sample in a flow stream of a flow cytometer). Embodiments of the present disclosure find use where enhancing the effectiveness of emission and scattered light measurements in flow cytometry are desired, such as in research and high throughput laboratory testing. The present disclosure also finds use where it is desirable to provide a flow cytometer with improved cell sorting accuracy, enhanced particle collection, reduced energy consumption, particle charging efficiency, more accurate particle charging and enhanced particle deflection during cell sorting.

The present disclosure also finds use in applications where cells prepared from a biological sample may be desired for research, laboratory testing or for use in therapy. In some embodiments, the subject methods and devices may facilitate the obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Although the foregoing invention has been described in some detail by way of illustration and example for purposes of clarity of understanding, it is readily apparent to those of ordinary skill in the art in light of the teachings of this disclosure that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A system comprising:
a flow cell configured to propagate a sample in a flow stream;
a light source configured to irradiate the sample in the flow cell; and
a detector unit comprising a detector array, wherein the detector unit is configured to differentially detect light from the flow cell by individually deactivating a subset of the detectors in the array while the sample is irradiated with the light source, and the subset of deactivated detectors is configured to obscure light received from a portion of the flow cell and permit the detection of light received from a different portion of the flow cell.

2. The system according to claim 1, wherein the detector array comprises an array of photodiodes.

3. The system according to claim 1, wherein the detector unit further comprises an optical adjustment component,
wherein the detector unit differentially detects light from the flow stream by individually deactivating one or more components of the optical adjustment component.

4. The system according to claim 3, wherein the optical adjustment component comprises a fused fiber optic component.

5. The system according to claim 4, wherein the fused fiber optic component comprises a tapered fused fiber optic bundle.

6. The system according to claim 4, wherein the detector unit further comprises a light conducting material positioned between the fused fiber optic component and the detector array.

7. The system according to claim 3, wherein the optical adjustment component comprises one or more lenses.

8. A system comprising:
a flow cell configured to propagate a sample in a flow stream;
a light source configured to irradiate the sample in the flow cell; and
a detector unit comprising a detector and a micro-opto-electro-mechanical system having a plurality of individually actuatable micro-mirrors configured to reflect light from the flow cell to the detector, wherein the detector unit is configured to differentially detect light received from the flow cell by individually deactivating a subset of the micro-mirrors such that the deactivated subset of micro-mirrors reflects light received from a portion of the flow cell away from the detector while permitting the detection of light received from a different portion from the flow cell.

9. The system according to claim 8, wherein the micro-opto-electro-mechanical system is configured to reflect away from the detector at least one of:
light received from a first component of the sample, and permit the detection of light received from a second component of the sample; and
incident light from the light source.

10. The system according to claim 1, wherein the system is a flow cytometer.

11. A method comprising:
irradiating a flow cell comprising a sample in a flow stream with a light source; and
detecting light from the flow cell with a detector unit comprising a detector array, wherein the detector unit is configured to differentially detect light from the flow cell by individually deactivating a subset of the detectors in the array while the sample is irradiated with the light source, and the subset of deactivated detectors is configured to obscure light received from a portion of the flow cell and permit the detection of light received from a different portion of the flow cell.

12. The method according to claim 11, wherein the detector unit further comprises an optical adjustment component,
wherein the method further comprises individually deactivating one or more components of the optical adjustment component.

13. The method according to claim 12, wherein the optical adjustment component comprises a micro-opto-electro-mechanical system.

14. A kit comprising:
a flow cell configured to propagate a sample in a flow stream;
an optical adjustment component; and
a detector unit comprising a detector array, wherein the detector unit is configured to differentially detect light from the flow cell by individually deactivating a subset of the detectors in the array while the sample is irradiated with the light source, and the subset of deactivated detectors is configured to obscure light received from a portion of the flow cell and permit the detection of light received from a different portion of the flow cell.

15. The system according to claim 1, wherein the detectors in the detector array are arranged in a square or rectangular configuration.

16. The system according to claim 1, wherein the subset of deactivated detectors forms a predetermined pattern within the detector array.

17. The system according to claim 16, wherein the predetermined pattern comprises a line of deactivated detectors.

18. The system according to claim 16, wherein the predetermined pattern comprises a square of deactivated detectors.

19. The system according to claim 1, wherein the subset of deactivated detectors is configured to obscure light received from a first component of the sample and permit the detection of light received from a second component of the sample.

20. The system according to claim 1, wherein the subset of deactivated detectors is configured to obscure incident light from the light source.

* * * * *